United States Patent Office 3,064,172
Patented Nov. 13, 1962

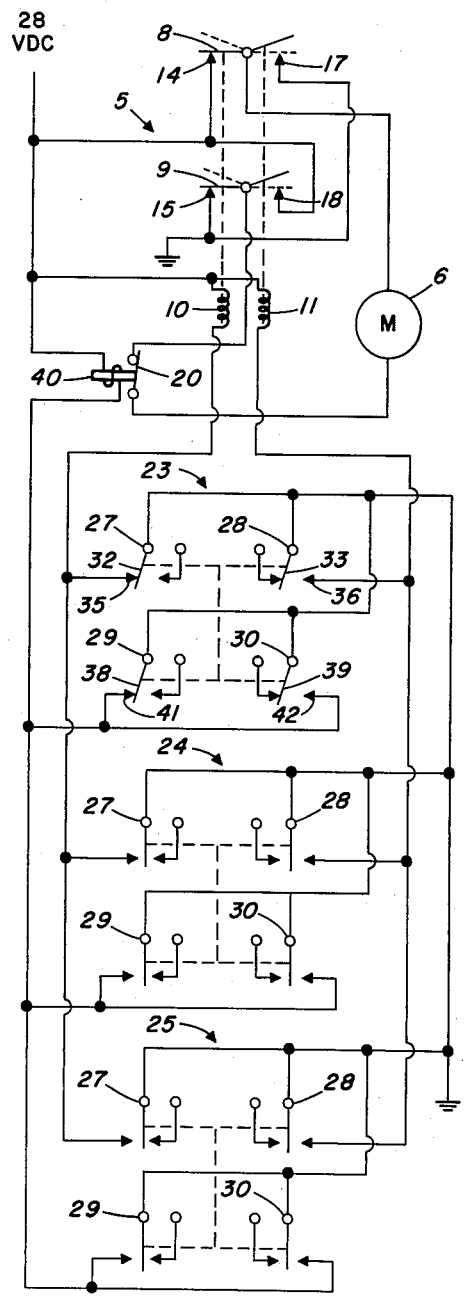

3,064,172
RELAY SWITCHING DEVICE
Ray L. Young and Duane F. Melchert, Cedar Rapids, Iowa, assignors to Collins Radio Company, Cedar Rapids, Iowa, a corporation of Iowa
Filed Dec. 5, 1960, Ser. No. 73,589
6 Claims. (Cl. 318—293)

This invention relates to a system for controlling and determining the direction of current flow to a reversible motor or the like and more particularly to a system for controlling the direction of current flow to a reversible motor by means of a bistable relay controlled by a plurality of remotely situated snap switches.

It is often found desirable to control a reversible motor or other polarity sensitive device from a remotely situated position. Such would be the case, for example, when it is desired to operate a reversible motor from a plurality of remotely situated positions or when it is found desirable to operate a reversible motor selectively connected to a plurality of outputs.

Heretofore, various systems have been proposed and utilized for controlling the direction of operation of a reversible motor. However, all of these systems have proven inadequate in providing a simple, yet efficient system utilizing a minimum of wires to attain relatively trouble-free operation.

It is therefore, an object of this invention to provide an improved system for controlling and determining the direction of current flow to a reversible motor or the like, that is simple, efficient and utilizes a minimum of wires.

More particularly, it is an object of this invention to provide a system for controlling and determining the direction of current flow to a reversible motor which utilizes a bistable relay and a plurality of remotely situated switches.

More particularly, it is an object of this invention to provide a system for controlling and determining the direction of current flow to a reversible motor which utilizes a bistable relay having a pair of movable contactors that are movable from one stable position to the other depending upon the relay coil energized, which energization in turn depends upon which of the plurality of remotely situated snap switches is closed by the operator.

It is still another object of this invention to provide a system for controlling and determining the direction of current flow to a reversible motor wherein even if more than one of the plurality of remotely situated switches should be simultaneously closed the power supply will not be grounded.

With these and other objects in view which will become apparent to one skilled in the art as the description proceeds, this invention resides in the novel construction, combination and arrangement of parts substantially as hereinafter described and more particularly defined by the appended claims, it being understood that such changes in the precise embodiment of the herein disclosed invention may be submitted as come within the scope of the claims.

The accompanying drawing illustrates one complete example of the invention constructed according to the best mode so far devised for the practical application of the principles thereof and in which the single figure shown illustrates a schematic representation of the below described system of this invention.

Referring now to the drawing, the numeral 5 refers generally to the bistable relay utilized in this invention to reverse the flow of current to direct current motor 6. Relay 5 comprises a pair of movable contactors 8 and 9, which contactors are bistable and constrained to simultaneous movement from one stable position to the other under the influence of relay coils 10 and 11.

As shown in the drawing, relay coil 10, when energized, causes bistable contactors 8 and 9 to rock to the left, or counterclockwise, to engage contacts 14 and 15, respectively. Should relay coil 11 be energized, however, movable contactors 8 and 9 would then be caused to rock to the right, or clockwise, so that each contactor assumes its other stable position (as shown by dotted lines) wherein movable containers 8 and 9 engage contacts 17 and 18, respectively. Contacts 14 and 18 are connected to a source of direct voltage, preferably 28 volts, while contacts 15 and 17 are connected to ground. In addition, movable contactors 8 and 9 are electrically connected to one another through motor 6 and snap switch 20 connected in series. Switch 20 is preferably a single-throw normally open switch and may, if desired, be a solenoid switch. Thus, while relay 5 determines the direction of current flow to motor 6, switch 20 makes and breaks the circuit to thus control the energization of motor 6.

To control the actuation of switch 20 and the selective energization of coils 10 and 11, a plurality of remotely situated switch assemblies 23, 24 and 25 may be provided. As shown in the drawings, each of these switches may comprise an upper pair of double-throw snap switches 27 and 28 and a lower pair of double-throw normally open snap switches 29 and 30. As shown in connection with switch assemblies 24 and 25, the movable contactor of each switch is normally centered to define the open position. It is to be appreciated, of course, that the switches shown are merely for illustrative purposes and that various combinations or switch types might be utilized. For example, switches 27 and 28 might be combined into one double-throw switch, as could switches 29 and 30. Also, if desired, switches 27 through 30 could be combined into one double-throw normally open switch, isolation of relay coils being attained by providing a diode in series with each relay coil in a manner well known in the art. In any event, switches 27, 28, 29 and 30 must all be constrained to simultaneous operation and may all be constrained to operation as a part of a rocker switch assembly, such as, for example, that shown and described in patent application Number 14,598, filed March 14, 1960 by Ralph J. Meyer entitled, "Rocker Switch Assembly" and assigned to the assignee of the present invention.

As shown in the drawing, the upper portion of each switch assembly may be utilized to energize relay coils 10 and 11. When switch assembly 23 is actuated, for example, so that the movable contacts 32 and 33 of switches 27 and 28 are moved to the left, a circuit is completed from the 28 volt power supply through relay coil 10 and switch 27 (contactor 32 is in engagement with contact 35) to ground. In like manner, if switch assembly 23 is actuated so that switches 27 and 28 move to the right, relay coil 11 would be energized since the circuit would then be provided from the 28 volt power supply through relay coil 11 and switch 28 (contactor 33 is in engagement with contact 36) to ground.

If switch assembly 23 is actuated so that movable contactors 27 and 28 are moved to the left, the lower portion of switch assembly 23 is likewise actuated, so that movable contactors 38 and 39 of switches 29 and 30 also move to the left, since these switches are constrained to operate as one. This movement causes energization of solenoid 40, since a closed circuit is provided from the 28 volt power supply through the coil of solenoid 40 and switch 29 (movable contactor 38 is in engagement with contact 41) to ground. In like manner, if switch assembly 23 is actuated to move movable contactors 38 and 39 to the right, solenoid 40 is again energized since a circuit is provided from the 28 volt power supply through the coil of solenoid 40 and switch 30 (movable contactor 39 is in engagement with contact 42) to ground.

In like manner, of course, switch assemblies 24 and 25 may be actuated so that the movable contactors are moved either to the left or to the right to energize solenoid 40 and selectively energize coils 10 and 11 depending upon the direction thrown. It is to be appreciated, of course, that although three switch assemblies are shown herein, any number might be employed without departing from the scope of this invention. Likewise, it is to be appreciated that although certain contacts of the switch assemblies are not shown as connected, they could be connected in accordance with the teachings herein to control the energization and direction of operation of a reversible motor or other polarity sensitive load.

In operation, when a remotely situated operator desires that the reversible motor rotate in its forward direction, he simply depresses the switch assembly at his disposal, for example, switch assembly 23, as that the movable contactors of switches 27 through 30 are thrown to the left as shown in the drawing) so that contactors 32 and 38 engage contacts 35 and 41, respectively. This causes energization of relay coil 10 and the movable contactors 8 and 9 of bistable relay 5 will be influenced to rock counter-clockwise to the left stable position (as shown in the drawing). Solenoid 40 will be energized (since switch 29 is closed) and the motor circuit will thus be completed from the power supply through contact 14, contactor 8, motor 6, switch 20, contactor 9 and contact 15 to ground. Motor 6 will therefore operate in a forward direction so long as switch 20 remains closed. Switch 20 will remain closed so long as switch 29 is held in a closed position or so long as switch 20 is held closed by some other means such as, for example, by shaft positioning means (not shown) connected with said solenoid to permit the switch to open only at a precise preselected point in a manner well known in the art.

If later an operator wishes to operate motor 6 in the same forward direction, switch assembly 23, 24 or 25 is actuated so that the movable contactors are again thrown to the left (as shown in the drawing), and relay coil 10 will again be energized as will solenoid 40 to close switch 20. However, since the bistable relay is already in the left stable position, it will not be affected by the energization of coil 10 and motor 6 will operate in its forward direction in the same manner as brought out hereinabove.

If, however, any switch assembly is actuated to move the movable contactors of that switch assembly to the right, as for example, if switch assembly 23 is actuated so that movable contactor 33 and 39 are caused to engage contacts 36 and 40, respectively, this causes energization of relay coil 11 and movable contactors 8 and 9 will be influenced to rock clockwise so that contactors 8 and 9 assume a right stable position (as shown in dotted lines in the drawing). Solenoid 40 will again be energized (since switch 30 is closed) and the motor circuit will then be completed from the power supply through contact 18, contactor 9, switch 20, motor 6, contactor 8, and contact 17 to ground. Motor 6 will therefore operate in a reverse direction so long as switch 20 remains closed.

If any two of the switch assemblies are actuated at the same time, however, the power supply will still not be grounded and a short circuit is therefore avoided even if this contingency occurs.

It should be evident from the foregoing to one skilled in the art that the system of this invention provides an improved switching device which utilizes a minmum of wires, is simple and compact, but yet is highly efficient for its purposes.

What is claimed as our invention is:

1. An electrical system for controlling the energization and direction of operation of a reversible direct current motor, comprising: a reversible direct current motor; means for energizing said motor, said means including in series a bistable relay for determining the direction of current flow to said motor and a first normally open switch; and control means including a first group of normally open switches connected in parallel with one another whereby closing of any one of said first groups of switches causes said first switch to be closed to thus energize said motor and causes said bistable relay to assume a first stable position so that said motor operates in one predetermined direction, and a second group of normally open switches connetced in parallel with one another and with said first group of switches whereby closing of any one of said second group of switches also causes said first switch to be closed to thus energize said motor and causes said bistable relay to assume a second stable position so that said motor operates in the direction opposite to said one predetermined direction.

2. The switching device of claim 1 wherein said first switch is a solenoid switch, said solenoid being energized by closing any of said groups of switches.

3. The switching device of claim 1 wherein said bistable relay comprises a pair of coils and a pair of bistable movable contactors that are caused to simultaneously shift from one stable position to the other due to selective energization of said relay coils.

4. The switching device of claim 3 wherein said groups of switches comprise normally open double-throw switches which when thrown in one direction cause said movable contactors of said relay to assume said one stable position and when thrown in the other direction cause the movable contactors of said relay to assume said second stable position.

5. An electrical system for controlling the energization and operation of a reversible direct current motor, comprising: a reversible direct current motor; a souce of direct current; means connecting said motor to said source including a normally open single-throw switch and a serially connected bistable relay, said relay having a pair of movable contactors and first and second relay coils, said first relay coil influencing said movable contactor to assume a first stable position in which said motor is adapted to be electrically connected to said source for operation in one direction and said second relay coil influencing said movable contactors to assume a second stable position in which said motor is adapted to be electrically connected to said power source for operation in the opposite direction; a plurality of normally open double-throw switches connected in parallel with one another and connected with said relay coils whereby each said switch when thrown in one direction causes said first relay coil to be energized and when thrown in the other direction causes said second relay coil to be energized so that said movable contactors are caused to move from one stable position to the other only when one of said plurality of switches is thrown in a direction opposite to that of its predecessor, said plurality of switches also being connected serially with said single-throw switch so that said motor is energized whenever any one of said plurality of switches is thrown irrespective of whether said movable contactors are caused to shift from one stable position to the other.

6. A switching system comprising: a polarity sensitive load; means for supplying direct current to said load including a memory device for controlling the direction of current applied to said load and normally open switch means serially connected with said load and said memory device; and first and second groups of switches connected in electrical parallel with one another for controlling the actuation of said normally open switch means, each said switch also being electrically connected with said memory device whereby closing any one of said groups of switches causes said normally open switch to be closed to supply current to said load the direction of which is unchanged if the preceding switch closed was from the same group and opposite if from a different group.

References Cited in the file of this patent

UNITED STATES PATENTS

| | | |
|---|---|---|
| 2,972,103 | Cunniff | Feb. 14, 1961 |
| 2,976,469 | Christiano | Mar. 21, 1961 |